Feb. 5, 1957 W. H. DAILEY, JR 2,780,185
COMBUSTION APPARATUS
Filed Feb. 13, 1953
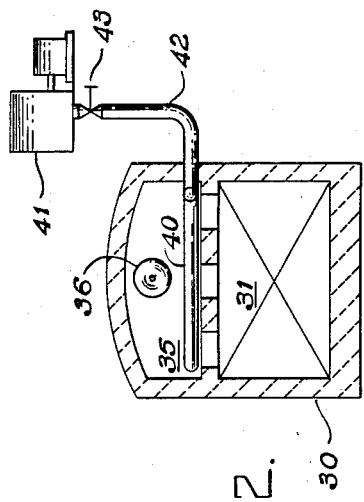
Fig. 2.
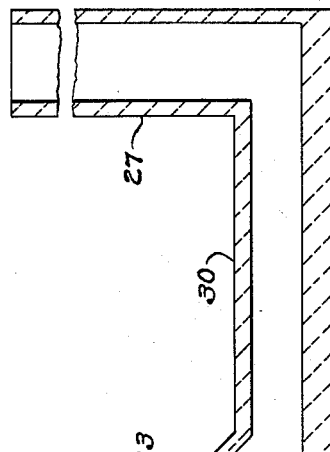
Fig. 1.
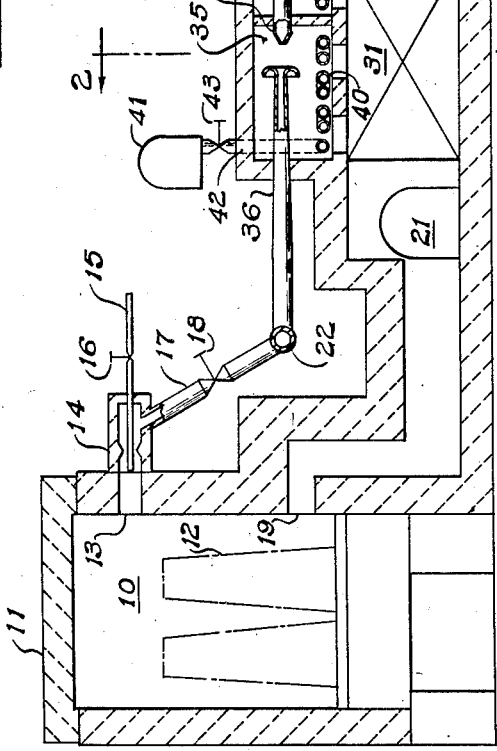
INVENTOR.
W. H. DAILEY JR.
BY
Charles S. Haughey
Agt.

United States Patent Office 2,780,185
Patented Feb. 5, 1957

2,780,185
COMBUSTION APPARATUS

William H. Dailey, Jr., Toledo, Ohio, assignor to Surface Combustion Corporation, Toledo, Ohio, a corporation of Ohio Application February 13, 1953, Serial No. 336,710

2 Claims. (Cl. 110—56)

This invention relates to combustion apparatus for high temperature heating furnaces such as soaking pits and the like. In high temperature furnace operation it is common practice to preheat the air for support of combustion by means of a recuperator heated by flue gas vented from the furnace. Refractory tile recuperators are well adapted to withstand the high temperatures of the flue gas vented from the furnace, but are not adapted to withstand differential pressures between the air and flue gas streams flowing through the recuperator. Hot fans have been proposed to draw the air through the recuperator rather than forcing it through under pressure, but because of limitations inherent in available fan materials, the safe operating fan temperatures are too low for attainable air preheat temperatures. To avoid the use of hot fans, yet attain high air preheat temperatures without subjecting tile-recuperators to high air pressures, it has been proposed to preheat a second, high pressure air stream in a metallic recuperator and utilize this second pressurized and heated air stream as motive air in a jet pump to induce flow of air through a refractory recuperator. This has been found to be impracticable where the flue gas is chemically corrosive to metals available for such recuperators. This invention may be considered as an improvement on the apparatus disclosed in U. S. Patent to Hepburn 2,627,398, and makes it practicable to employ a metal recuperator in combination with a refractory recuperator when flue gas is so corrosive, thus making possible practicable application of such jet pumps in spite of corrosive flue gases.

For a consideration of what I believe to be novel and my invention, attention is directed to the following portion of this specification, the drawings and the claims appended hereto.

In the drawings:

Fig. 1 shows a soaking pit installation embodying the present invention.

Fig. 2 shows a sectional view of a portion of the installation taken on line 2—2 of Fig. 1.

The soaking pit illustrated comprises a heating and combustion chamber 10 which is normally closed by a cover 11 and is of a size to contain a plurality of steel ingots 12 indicated by discontinuous line outlines. Heating flames enter the chamber 10 from a firing port 13 whose inlet is coincident with the outlet of a burner 14 to which fuel is delivered by a supply pipe 15 having a control valve 16, and to which air for combustion is delivered by a duct 17 having a control valve 18. Flue gas (products of combustion) is vented from the chamber through an exhaust port 19. The heating unit thus far described is usually one of several units having a common flue gas exhaust manifold 21 and a common air distributing manifold 22. The predetermined ratio of air to fuel delivered to the burner 14 may be maintained substantially constant by suitable instrumentation and control of the respective air and fuel valves.

The flue gas manifold 21 connects with a stack 27 through a connecting flue 30 and there is positioned in the flue between the exhaust manifold and the stack a refractory tile recuperator 31 which may be considered as being of the type disclosed in patent to Stein 1,404,721. A refractory tile recuperator can withstand the high temperatures of flue gases, and corrosive flue gases resulting from use of high sulfur fuels, blast furnace gas and the like. Cold air enters the tile recuperator 31 at cold air inlet 33, passes downward into the air passages of the recuperator to be heated therein, and passes therefrom into a refractory lined plenum chamber or hot air duct 35 wherein a high pressure type metal recuperator 40 is disposed to receive heat therefrom. Heat is transferred to the recuperator 40 by reflection or radiation from the refractory walls of the chamber 35 and from the tile recuperator 31 therebelow, and also by convection from the hot air leaving the tile recuperator. A nozzle 37 at the outlet from the metal recuperator 40 delivers air therefrom into a venturi entraining tube 36 to constitute a jet pump for drawing air through the tile recuperator 31 and delivering it to the air manifold. Motive fluid for the jet pump is air under pressure which is supplied by a compressor or blower 41 through a conduit 42 and valve 43 therein to the inlet end of the metal recuperator 40. Thus air under pressure in the metal recuperator is heated therein before it is expanded through the nozzle of the jet pump to serve as motive fluid therefor. The heat received by this motive fluid is transferred thereto from air which has been heated in the tile recuperator. In this manner heat in a heated air stream is converted into mechanical energy to move that air stream, and the residual heat after said conversion to mechanical energy is returned to the air stream via the motive fluid.

Without intending to limit the application of this invention, it may be stated that an example of operating conditions might be motive fluid at about two pounds pressure and about 600° F. being used to deliver preheated air to the burners at about 4 ounces of pressure and 1000° F. to 1200° F. preheat temperature.

I claim:

1. In combustion apparatus for a furnace having a work heating chamber, the combination which comprises a burner for firing into the chamber, a refractory tile air heating recuperator having a cold air inlet and a hot air outlet, duct means for venting flue gas from the chamber through said recuperator, said recuperator being heated by said flue gas, means forming an air passage connecting the hot air outlet of the recuperator with the burner, a jet pump in said passage for drawing air through the recuperator to said pump and for forcing the heated air therefrom to the burner, the jet pump comprising an entraining tube and a nozzle for discharging motive fluid therethrough, a blower constituting a source of air under pressure to serve as motive fluid for operating the jet pump, a metallic air heating recuperator disposed in said air passage between the tile recuperator and the jet pump and adapted to be heated by the air in said passage, and duct means for delivering air from the blower to the metallic recuperator and thence to the nozzle of the jet pump, said air being heated by said metallic recuperator.

2. Apparatus according to claim 1 wherein said air passage comprises a refractory lined plenum chamber adjacent the hot air outlet of the tile recuperator, and said metallic recuperator and jet pump are disposed in said chamber whereby to receive heat reflected from the refractory walls thereof.

References Cited in the file of this patent

UNITED STATES PATENTS

| 181,440 | Hobson | Aug. 22, 1876 |
| 338,907 | Acheson | Mar. 30, 1886 |
| 385,178 | Haggenmiller | June 26, 1888 |
| 497,741 | Ackroyd | May 16, 1893 |
| 736,066 | Busiel | Aug. 11, 1903 |
| 906,174 | Ward | Dec. 8, 1908 |

FOREIGN PATENTS

| 197,024 | Great Britain | May 7, 1923 |